United States Patent [19]

Uchida et al.

[11] Patent Number: 4,759,731
[45] Date of Patent: Jul. 26, 1988

[54] CONTROL DEVICE FOR MARINE ENGINE

[75] Inventors: Tatsuki Uchida; Katsumi Torigai, both of Hamamatsu, Japan

[73] Assignee: Sanshin Kogyo Kabushiki Kaisha, Hamamatsu, Japan

[21] Appl. No.: 906,329

[22] Filed: Sep. 11, 1986

[30] Foreign Application Priority Data

Sep. 19, 1985 [JP] Japan ............................... 60-205377

[51] Int. Cl.⁴ ............................................. B63H 19/00
[52] U.S. Cl. ............................................ 440/1; 440/84; 440/87
[58] Field of Search ............... 440/1, 2, 6, 7, 87, 440/900; 114/144 E, 144 R, 144 A; 123/400-403, 413; 74/480 B; 180/271-273, 282-285

[56] References Cited

U.S. PATENT DOCUMENTS

| 2,845,891 | 8/1958 | Frey | 114/144 A |
| 3,807,343 | 4/1974 | Peebles | 440/1 |
| 4,022,146 | 5/1977 | Sadler | 440/1 |
| 4,100,877 | 7/1978 | Scott et al. | 440/87 |
| 4,458,115 | 7/1984 | Peterson | 440/87 |

Primary Examiner—Joseph F. Peters, Jr.
Assistant Examiner—Stephen P. Avila
Attorney, Agent, or Firm—Ernest A. Beutler

[57] ABSTRACT

A watercraft embodying an improved control arrangement wherein the speed of the watercraft is reduced in the event of operator inattention is sensed.

12 Claims, 4 Drawing Sheets

CONTROL DEVICE FOR MARINE ENGINE

BACKGROUND OF THE INVENTION

This invention relates to a control device for a marine engine and more particularly to a vehicle control that will reduce the speed of the vehicle in the event of operator inattention.

Many types of vehicles including watercraft employ automatic speed control devices. Such devices have the convenience of permitting the operator to set the desired vehicle speed, and that speed will be maintained without necessitating the operator's continual control of the accelerator or throttle control mechanism. Although these automatic speed control devices have this advantage, there is also a disadvantage. That is, if the operator becomes inattentive, the speed of the vehicle may become faster than desired for a given set of circumstances. For example, in a watercraft, there is a possibility that the operator may fall overboard, and it would be desirable to have the speed of the watercraft reduced under this condition.

It is, therefore, a principle object of this invention to provide an arrangement for reducing the speed of the vehicle in the event of operator inattention.

It is a further object of this invention to provide a speed control for a watercraft which will have the speed of the watercraft reduced in the event of operator inattention.

SUMMARY OF THE INVENTION

This invention is adapted to be embodied in an automatic speed control for a vehicle that is powered by an engine and which is operated by an operator. Speed control means are provided for controlling the vehicle speed and an automatic speed control element setable by the operator is operated to establish the desired speed. The speed control means is operated in response to a signal from the automatic speed control element for maintaining the desired vehicle speed. The vehicle is provided with a further vehicle control element that is operated by the operator for controlling a vehicle operation other than vehicle speed. Means are provided for reducing the vehicle speed when the further vehicle control element is in a position other than the predetermined position for more than a predetermined period of time which indicates operator inattention.

DETAILED DESCRIPTION OF THE PREFERRED EMBODIMENT OF THE INVENTION

Figure 1:
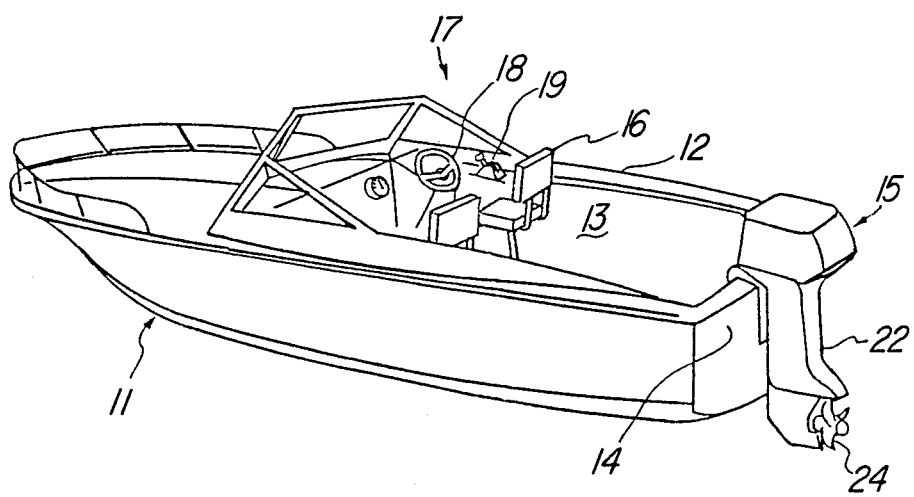
FIG. 1 is a perspective view of a watercraft constructed in accordance with an embodiment of the invention.

Referring first to FIG. 1, a watercraft constructed in accordance with an embodiment of the invention is identified generally by the reference numeral 11. The watercraft 11 has a hull 12 that defines a cockpit 13. A transom 14 is provided at the rear of the cockpit 13 and an outboard motor 15 is supported on the transom 14 for powering the watercraft 11. It should be noted that, although the invention is described in conjunction with an outboard motor propelled watercraft, the invention may be employed in connection with other types of marine propulsion units and, in fact, may be practiced with other types of vehicles. The invention has particular utilities, however, in connection with watercraft.

An operator's seat 16 is positioned within the cockpit 13 and in proximity to the watercraft control, indicated generally by the reference numeral 17. These controls 17 include a helm or steering wheel 18 and a combined transmission control and throttle lever 19.

Figure 2:
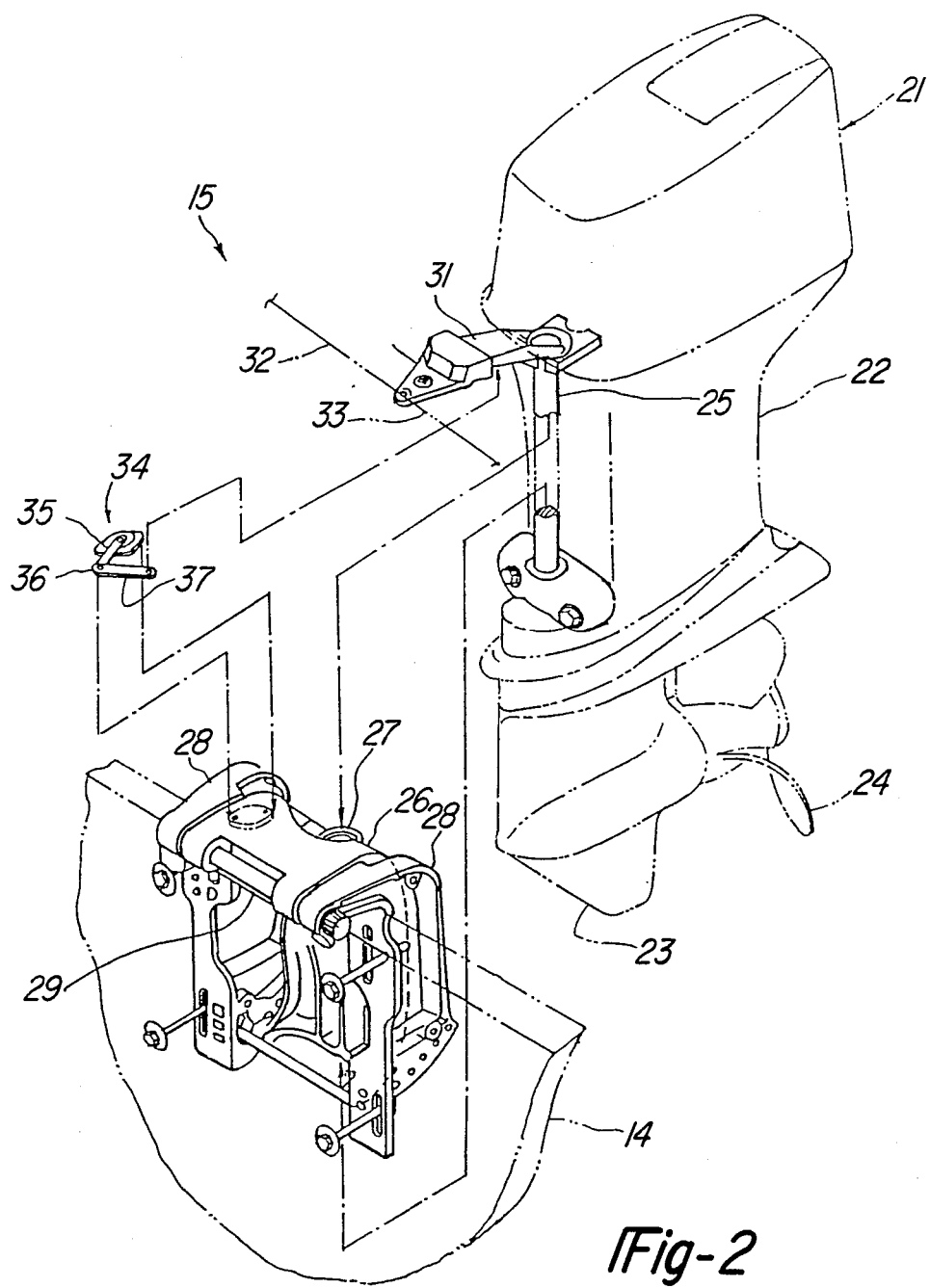
FIG. 2 is a partially exploded perspective view showing the upward drive of the watercraft.

Referring now additionally to FIG. 2, the outboard motor 15 is comprised of a power head, indicated generally by the reference numeral 21, that includes an internal combustion engine and surrounding protective cowling. A drive shaft housing 22 depends upon the power head 21 and contains a drive shaft (not shown) that is driven by the engine of the power head 21 in a known manner. A lower unit 23 is affixed to the drive shaft housing 22 and rotatably journals a propeller 24. The propeller 24 is driven from the drive shaft by means of a forward neutral reverse transmission (not shown) which may be of any known type and which is contained within the lower unit 23.

A steering shaft 25 is affixed in a known manner to the drive shaft housing 22 and is rotatably journaled in a swivel bracket 26, specifically a journaling portion 27 of the swivel bracket 26 for steering movement about an axis defined by the steering shaft 25 and swivel bracket portion 27. The swivel bracket 26 is, in turn, pivotally connected to a clamping bracket 28 by means of a pivot pin 29 for tilting movement of the outboard motor 15 about the horizontally extending axis defined by the pivot pin 29. The clamping bracket 28 is, in turn, affixed to the transom 14 in a known manner.

The steering bracket 31 is affixed to the upper end of the steering shaft 25 and extends forwardly for connection to a pair of steering cables 32 and 33 that are operated by the helm 18 for steering the outboard motor 15 and watercraft 11 in any known manner.

In accordance with the invention, a steering angle sensor, indicated generally by the reference numeral 34, is provided for indicating the angle of steering of the outboard motor 15. The steering angle sensor 34 includes a variable potentiometer or resistor 35 having a wiper arm 36 that is connected by means of a link 37 to the steering bracket 31. The variable potentiometer 35 is, in turn, affixed to the swivel bracket 26. Accordingly, pivotal movement of the outboard motor 15 about the steering shaft 25 will detect location of the wiper arm 36 to change the resistance of the potentiometer 35.

Figure 3:
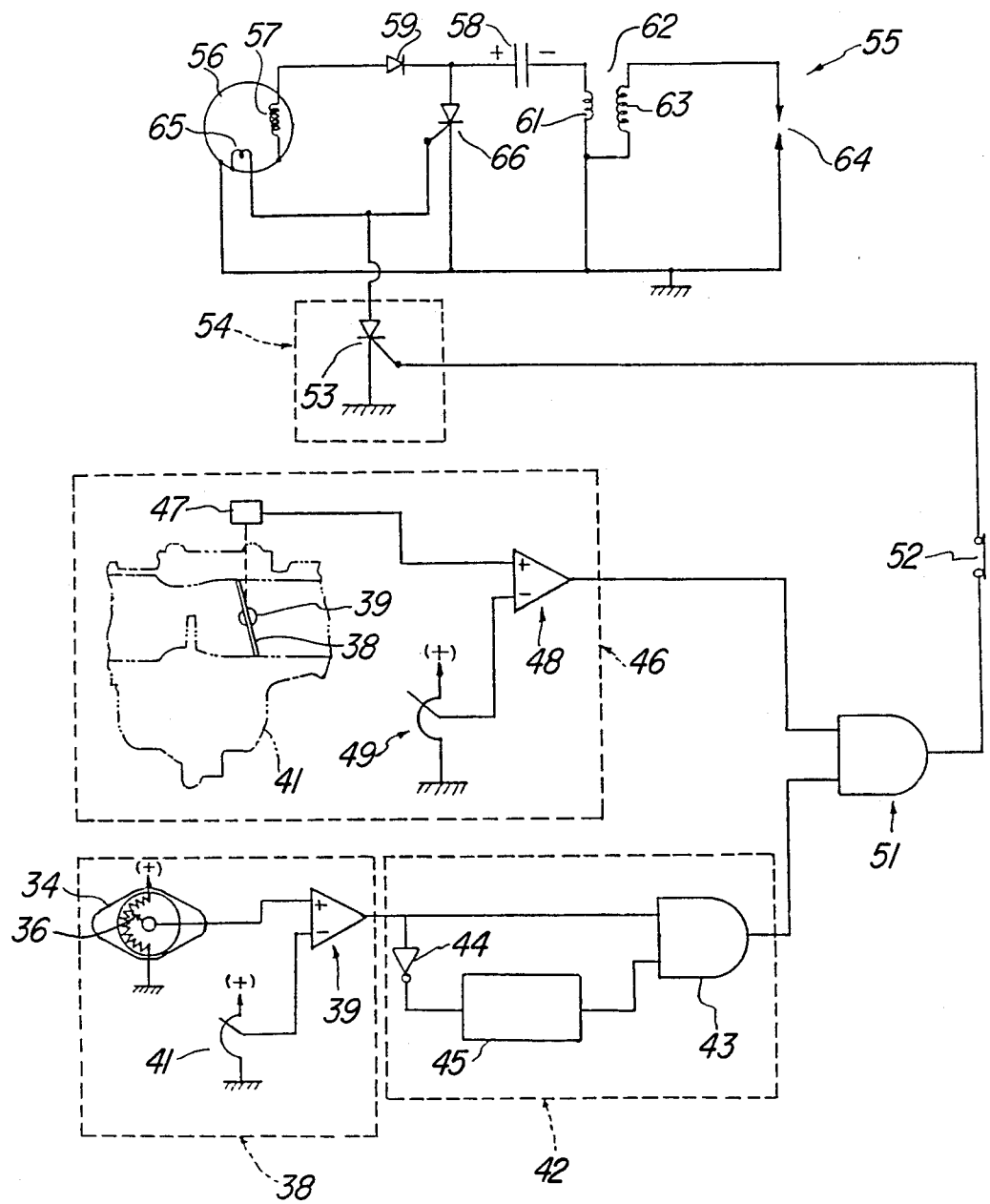
FIG. 3 is a schematic view showing the electrical control circuitry constructed in accordance with an embodiment of the invention.

Speed control element 19 is connected through a suitable mechanism (not shown) to a throttle valve 38 that is locatably journaled by a throttle valve shaft 39 in the body of a carburetor 41 (FIG. 3) for controlling the speed of the associated engine in a known manner. The construction of the throttle mechanism is set that an operator need not maintain his hand on the throttle control lever 19 in order to establish a preset speed for the engine. As a result, it is important to ensure that the speed of the watercraft 11 does not become excessive in the event of operator inattention or in the event the operator should fall overboard. The inattention of the operator may be sensed in a number of ways, and in accordance with the illustrated embodiment, this is sensed by the steering angle of the outboard motor 15. More specifically, it is known that if the operator does not maintain a grip on the helm 18, that the outboard motor will pivot to an extreme position. Generally, this will cause the outboard motor 15 to pivot to the right due to the counterclockwise rotation of the propeller as viewed from the bow. In accordance with the invention, a circuit is incorporated that senses the steering angle, and if the steering angle becomes excessive for more than a predetermined period of time, it is reasoned that the operator is either inattentive or has fallen overboard and the speed of the watercraft 11 is automatically reduced. FIG. 3 illustrates a specific embodiment of the manner in which such a control can be arranged.

Figure 4:
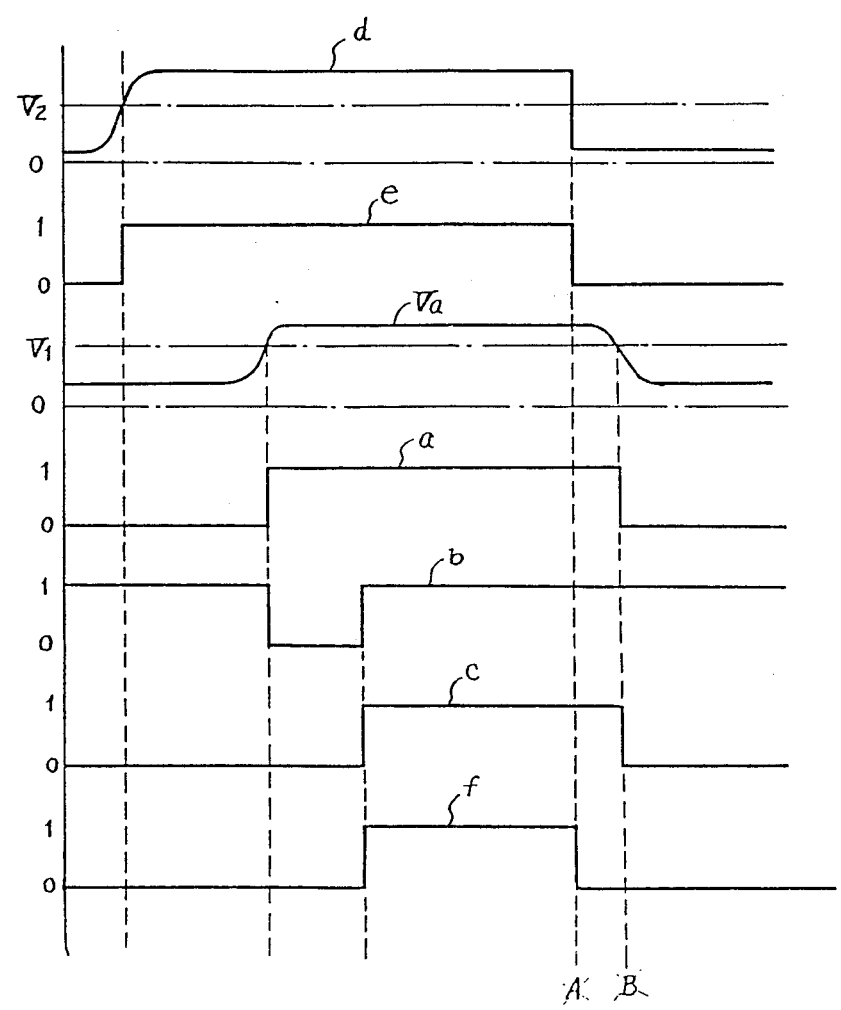
FIG. 4 is a schematic view showing how the circuit of FIG. 3 operates.

Referring now specifically to FIG. 3 and FIG. 4 which a indicates the output signal at a variety of locations in the circuit of the control mechanism, the steering angle sensor 34 forms a portion of a circuit, indicated generally by the block 38 which outputs a signal a when the steering angle is in a predetermined position which may be indicative of operator inattention or lack of control. The potentiometer 34 has its wiper arm 36 constructed so as to output a voltage signal $V_a$ that is indicative of the steering angle. This signal is transmitted to a comparator 39 which compares this signal with a fixed left-hand signal set by a potentiometer 41. This signal $V_1$ is selected as an angle which may indicate inattention, such as extreme right-hand steering as aforenoted.

Signal a is transmitted to a timer and comparator circuit, indicated generally by the reference numeral 42 which will output a signal c in the event the preset steering angle is exceeded for a given period of time. To this end, the signal a is transmitted to one terminal of an AND gate 43. In addition, the signal a is transmitted through an inverter 44 to a time circuit such as a multivibrator 45 which outputs a signal b for a predetermined period of time, such as one or two seconds, to the other terminal of the AND gate 43. Hence, the AND gate 43 will output a signal c when the preset steering angle (signal a) is exceeded for the period of time set by the time 45.

In accordance with the illustrated embodiment of the invention, the speed of the watercraft 11 will not be reduced when an output signal c is transmitted unless the operator has set to a speed greater than the predetermined speed by appropriately positioning the throttle control lever 19. To this end, there is provided a means for sensing the engine output and this sensing means is indicated generally by the block 46. This engine output sensing means includes a throttle position sensor 47 that is responsive to the positioning of the throttle valve shaft 39 and which outputs a signal d which is indicative of throttle position. The throttle position sensor 47 may constitute a variable potentiometer, and if output signal d is transmitted to a comparator 48. The signal d is compared with a fixed reference signal $V_2$ that is set by a variable potentiometer 49 to a value at which it is desirable to increase the vehicle speed in the event of operator inattention. When the speed $V_2$ is equalled or exceeded, the comparator 48 will output a signal e to one gate of an AND circuit 51. The other gate of the AND circuit 51 receives the output signal c from the AND circuit 43 and will output a signal f in the event that both the signals e and c are present. Output signal f may be employed for reducing the speed of the watercraft 11 in any of a variety of manners. For example, it may be employed to ship the transmission of the outboard drive to neutral, to close or reduce the opening of the throttle valve 38, or to stop or interrupt the ignition of the engine so as to either stop it or slow it if this latter method is employed in the illustrated embodiment.

The output signal f is transmitted through a transmission position indicator switch 52 to the gate of an SCR 53, which SCR 53 comprises a means for terminating engine operation, as indicated generally by the block 54. The transmission position indicator switch 52 is set that it will be closed when the transmission of the outboard motor 15 is in a condition other than in neutral. That is, the engine will not be stopped even if the signals e and c are present unless the transmission is shifted into either forward or reverse.

This way the engine is stopped by disabling its ignition, which ignition circuit is shown schematically in FIG. 3 and is identified generally by the reference numeral 55. The engine ignition system includes a rotating magnet 56 that cooperates with a charging coil 57 so as to charge a capacitor 58 through a diode 59. The capacitor 58 is in circuit with a primary winding 61 of an ignition coil 62. The ignition coil 62 has a secondary winding 63 that is in circuit with a spark plug 64.

Rotating magnet 56 also cooperates with a trigger coil 65 which is in circuit with the GATE of a transistor 66. When the rotating magnet passes the trigger coil 65, the gate of the SCR 66 will be rendered conductive, and the capacitor 58 will e discharged so as to induce a voltage in the primary winding 61 which is amplified in the secondary winding 63 for firing the spark plug 64 in a known manner.

The engine disabling or stopping means 54 comprises the SCR 53 which is in circuit with the pulsor coil 65 and ground. When the SCR 53 is rendered conductive by receiving the signal f, the gate of the transistor 66 cannot be rendered conductive and hence, the capacitor 58 will not be discharged and the spark plug 64 will not be fired.

It should be readily apparent that the described invention is particularly effective in ensuring against excessive speed of the vehicle in the event of operator inattention. In addition to the illustrated embodiment and those modifications disclosed, a number of other modifications may be made without departing from the spirit and scope of the invention as defined by the appended claims. For example, rather than using the steering angle potentiometer 34, a limit switch may be employed to indicate that the predetermined steering angle has been exceeded.

We claim:

1. An automatic speed control for a vehicle propelled by an engine, having another control for controlling another characteristic of vehicle operation than speed and operated by an operator, speed control means for controlling the vehicle speed, an automatic speed control element setable by the operator for selectively establishing a desired speed, means for operating said speed control means in response to a signal from said automatic speed control element for maintaining the desired vehicle speed, a further vehicle control element operable by the operator through a normal range of positions for controlling said other vehicle operation than vehicle speed, and means for reducing the vehicle speed when said further vehicle control element is in an extreme position in its normal range of positions for more than a preset period of time indicating operator inattention.

2. An automatic speed control for a vehicle as claimed in claim 1, wherein the means for reducing the vehicle speed does not reduce the vehicle speed unless the vehicle speed is set greater than a predetermined value.

3. An automatic speed control for a vehicle as claimed in claim 1, wherein the further vehicle control element comprises means for steering the vehicle.

4. An automatic speed control for a vehicle powered by an engine, means for steering said vehicle and operated by an operator, speed control means for controlling the vehicle speed, an automatic speed control element settable by the operator for selectively establishing a desired speed, means for operating said speed control for means in response to a signal from said automatic speed control element for maintaining the desired speed, a steering element operable by the operator for controlling said vehicle steering, and means for reducing the vehicle speed when said steering element is in a position other than a predetermined position for more than a preset period of time indicating operator inattention, said means for reducing the vehicle speed does not reduce the vehicle speed unless the vehicle is steered more than a predetermined amount.

5. An automatic speed control for a vehicle as claimed in claim 4, wherein the vehicle comprises a watercraft.

6. An automatic speed control for a vehicle as claimed in claim 5, wherein the means for reducing the vehicle speed does not reduce the vehicle speed unless the vehicle speed is set greater than a predetermined value.

7. An automatic speed control for a vehicle as claimed in claim 6, wherein the vehicle speed is reduced by reducing the speed of the engine.

8. An automatic speed control for a vehicle as claimed in claim 7, wherein the speed is reduced by interrupting the ignition of the engine.

9. An automatic speed control for a vehicle as claimed in claim 8, wherein the vehicle's engine is stopped.

10. An automatic speed control for a vehicle as claimed in claim 1, wherein the vehicle speed is reduced by reducing the speed of the powering engine.

11. An automatic speed control for a vehicle as claimed in claim 10, wherein the speed is reduced by interrupting the ignition of the engine.

12. An automatic speed control for a vehicle as claimed in claim 11, wherein the vehicle's engine is stopped.

* * * * *